1,918,953

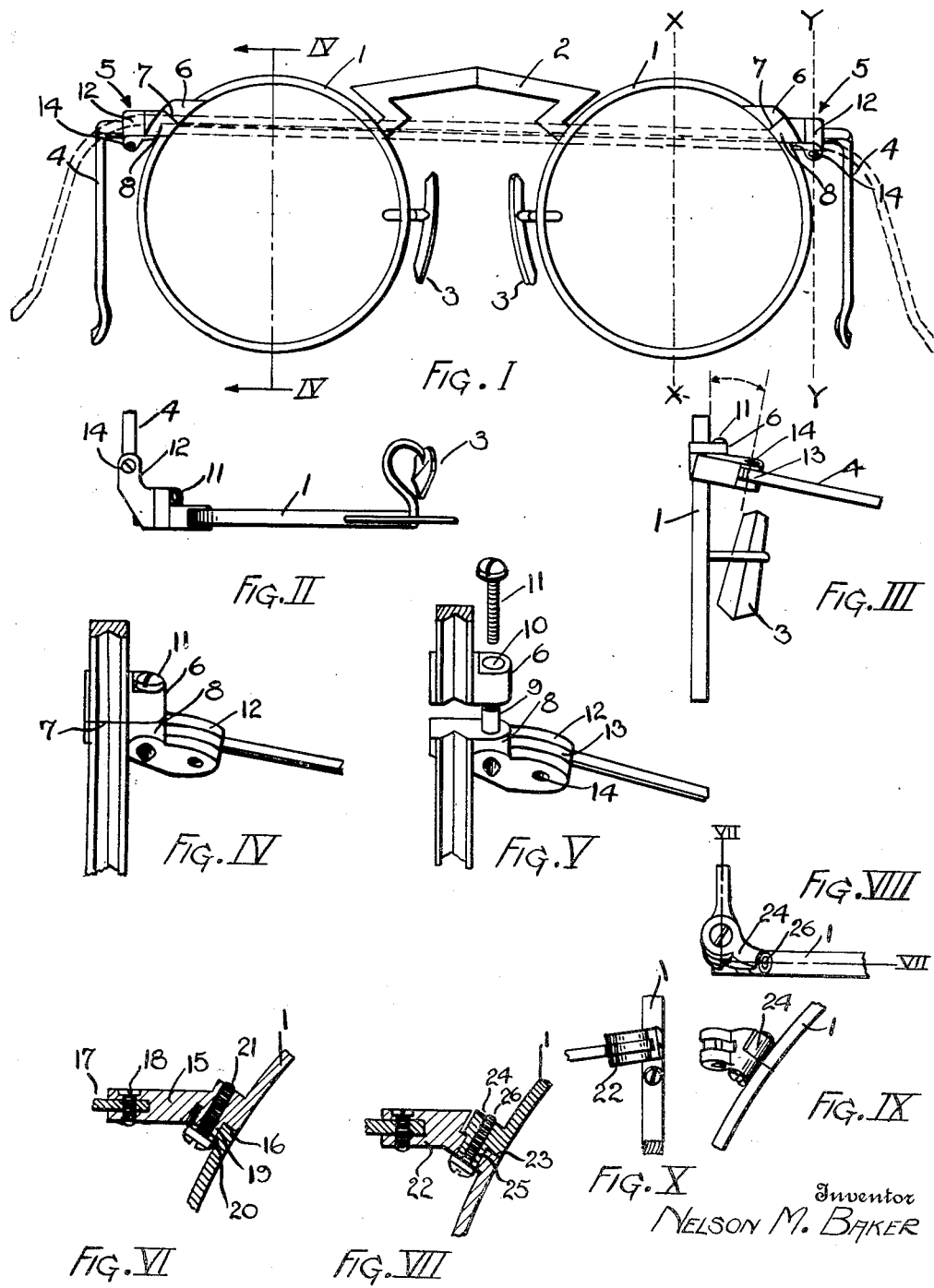
July 18, 1933.  N. M. BAKER  1,918,953
OPHTHALMIC MOUNTING
Filed Sept. 10, 1929
Inventor
NELSON M. BAKER
By Harry H. Styll.
Attorney Patented July 18, 1933

UNITED STATES PATENT OFFICE

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC MOUNTING

Application filed September 10, 1929. Serial No. 391,537.

This invention relates to improvements in ophthalmic mountings and has particular reference to an improved means of securing the lenses in a mounting having the temples positioned out of the line of vision of the wearer.

The principal object of this invention is to provide a wider margin of usable lenses for the said type of mounting than has heretofore been possible.

Another object of this invention is to facilitate the assembly of this type of mounting and particularly the process of fitting the lenses therein.

Another object of this invention is to provide means whereby the torsional pull of the temples upon the rims of an ophthalmic mounting will be greatly absorbed and the strain lessened.

Another object of the invention is to ensure a desirable rigidity at that part of the mounting subjected to most stress in every day use.

Another object of the invention is to render more sightly and less conspicuous the securing means for the rims of an ophthalmic mounting.

Another object of the invention is to provide a sufficiently strong and durable form of securing means which will not be subject to the heaviness and other disadvantages associated with such prior art securing means.

Other objects and advantages will become apparent from the following description taken in connection with the accompanying drawing and it will be apparent that many changes may be made in the details of construction and arrangement of parts without departing from the spirit of the invention as expressed in the accompanying claims. I, therefore, do not wish to be limited to the exact details shown and described as the preferred forms only have been shown by way of illustration.

Referring to the drawing:

Fig. I is a front view of an ophthalmic mounting embodying the invention.

Fig. II is a top view of one-half of the mounting shown in Fig. I.

Fig. III is a side view of the mounting shown in Fig. I.

Fig. IV is a section on line IV—IV of Fig. I.

Fig. V is a similar view to Fig. IV but shows the parts separated.

Fig. VI is a sectional view of a modified form of the invention.

Fig. VII is a sectional view taken on line VII—VII of Fig. VIII.

Fig. VIII is a top or plan view of a modification.

Fig. IX is a front view of the modification shown in Fig. VIII.

Fig. X is a side view of the same modification.

In the manufacturer of ophthalmic mountings it has been the usual practice to place the endpieces, which lock the rims around the lenses and also carry the temples, substantially in line with the center of the lenses or on the horizontal meridian. In these cases the locking means which was usually a small screw was practically always vertical, as will be apparent. Since the introduction of the high placed temples necessitating endpieces more or less at the top of the rims in order to avoid interference with side vision, the screw holes have still been placed vertical and caused much trouble on this score. The lenses may be a slight degree oversize and the joint faces of the endpieces will not meet. The holes are, therefore, not directly in line as the line of division is not on the horizontal meridian as heretofore, but much above it. This difficulty has caused much trouble from broken lenses, bent endpieces and all kinds of interference with steady production. In my invention I have eliminated all the trouble due to this cause, as will hereinafter be apparent. It will be obvious that in placing the endpieces out of the line of vision the best features of the former style should be maintained, such as symmetry, rigidity and long wear. It is the prime object of my invention, therefore, to provide means to maintain these features and so improve both the well known horizontal endpiece mounting and also the high placed endpiece type.

Referring to the drawing wherein similar reference characters denote corresponding parts throughout the several views, the numeral 1 denotes the split rims of my improved mounting carrying a high arch bridge 2 and the nose guards 3. The temples 4 and endpieces 5 are above the horizontal meridian of the rims 1, as shown in Fig. I, and the placing of the endpieces so introduces the novel features of my invention.

The upper portion 6 of the endpiece is attached to one side of the split lens rim and the joint face 7 is preferably formed substantially normal with the place of juncture at the lens rim. The lower portion 8 is attached to the other side of the split and abuts the joint face 7 at a similar normal position. In the lower portion 8 is a projection 9 fitting into a hole 10 in the upper portion 6 and is threaded to receive the screw member 11 to hold the parts together, all of which lie normal to the joint face 7. The temple carrying portion 12 is shaped to extend inconspicuously behind the plane of the lens rims, as clearly shown in Figs. II and III, and has a slot 13 and screw member 14 supporting the temple 4 in position. In order to bring the ear portions of the temple 4 in line with the wearer's ears, I preferably slope the temple carrying portion 12 at an angle to the rest of the endpiece, as shown in the drawing, and particularly in Fig. III.

It will thus be seen that many ingenious and novel features have been incorporated in the construction described. The joint face 7 and the projection 9 thereon are so constructed that variation in the size of the lenses to be fitted in the rims 1 will not render odd size lenses useless as heretofore. It will be obvious that if the joint face were cut parallel to the horizontal meridian as in previous constructions an oversize lens would keep the faces of the endpiece apart and prevent the hole 10 in each half from being aligned. This drawback was not present in the type of construction wherein the endpiece was on the horizontal meridian, but as soon as the endpiece was moved to the top of the lens rim the difficulty arose and served to reject numerous lenses and so slow up production and add to the cost of manufacture.

The strength and rigidity of the mounting when assembled are improved by the tubular projection 9 located in the upper portion 6 of the endpiece. A long thread bearing is also provided by this construction as will clearly be seen from Fig. V. Means are also provided for separating the endpiece portions 6 and 8 for insertion of a lens in the rim 1 without dislodging the temple 4 which is held in position by the separate screw member 14. As previously stated, the temple 4 will extend rearwardly when opened for wear at an angle to the plane of the lenses as is necessary to fit the wearer's face. When the temples are folded up across the lenses, however, for insertion in a suitable case, they will lie in a substantially similar horizontal plane parallel to the horizontal meridian of the lenses and so form a compact structure. This feature is made possible by the screw member 14 of the temple attachment being parallel with the vertical meridian of the lenses in one plane, as indicated by dotted lines XX and YY in Fig. I, although sloped back at an angle to the plane of the lenses in the other plane, as shown in Fig. III.

In Figs. VI and VII, I have shown modified forms of my novel construction. In Fig. VI the upper portion 15 of the endpiece is preferably integral with the lens rim 1 and has a joint face 16 normal to the place of juncture as in the previous construction. The upper portion 15 extends preferably parallel with the horizontal meridian of the lenses to carry the temple connection 17 held in place by the screw member 18 which is parallel with the vertical meridian of the lenses as in the previously described construction. Extending downwardly from the joint face 16, exteriorly of the lens rim 1, is a projection 19 similar to the one on the previously described construction. In this instance the lower portion 20 of the endpiece is formed to receive the projection 19 which is threaded to receive the screw member 21. The head of the same screw member 21 serves to draw the endpiece portions together when the screw is in position and so clamp the lens in the lens rim.

The alternative construction Fig. VII is very similar except that a lower portion 22 of lens rim 1 extends from a joint face 23 to form a temple connection. The upper portion 24 has a projection 25 and screw member 26 to draw the portions together. It will be apparent that all the previously described advantages are present in the developments shown and any of the constructions could be used with advantage.

The operation and use of the device will be apparent from the foregoing and the simplicity of this feature is one of the chief advantages.

From the foregoing it will be seen that in assembly of ophthalmic mountings much time and material will be saved by the use of my device and lenses of odd size be used with equal facility as those of perfect diameter. All the objects and advantages have been obtained by the provision of economical and simple means, particularly in providing a novel type of endpiece construction which improves a modern form of ophthalmic mounting and obviates the disadvantage usually associated with this new form.

Having described my invention, I claim:

1. In an ophthalmic mounting, a pair of split lens holding members connected by a bridge member, said splits being located above a horizontal plane connecting the mechanical centers of the lens holding members and extending normal to the tangent of each holding member at said location, an endpiece member adjacent one of the ends of the split members, said endpiece member having an opening therein, a temple connection adjacent the other end of the split members having an opening therein aligned with the opening in the endpiece member, a temple pivotally connected to the temple connection and means in the aligned openings for securing the endpiece member and the temple connection together, the axis of said securing means being substantially normal to the plane of the split and angularly related with the axis of the pivot of the temple so that the pull of the securing means is in a direction substantially normal to the split and in the plane of the lens holding member, said axis of the temple pivot lying at an acute angle with the axis of the securing means and converging towards each other below the connection when the device is positioned as worn on the face of the wearer.

2. In an ophthalmic mounting, a pair of split lens holding members connected by a bridge member, said splits being located above a horizontal plane connecting the mechanical centers of the lens holding members and extending substantially normal to the tangent of each rim at said location, an endpiece member adjacent one of the ends of the split members, said endpiece member having an opening therein, a housing member adjacent the other end of the split members having a head engaging member pivotally connected thereto, said housing having a cut out portion adapted to receive the endpiece member and having an opening aligned with the opening in said endpiece member, one of said openings having a threaded bore and screw means extending in said openings for securing the projection in said housing, the longitudinal axis of the screw lying at an angle with the axis of the pivot of the head engaging member and converging with said axis of the pivot below the connection when the device is positioned as worn on the face of the wearer.

3. In an ophthalmic mounting, a pair of split lens holding members connected by a bridge member, said splits being located above a horizontal plane connecting the mechanical centers of the lens holding members and extending normal to the tangent of each holding member at said location, an endpiece member adjacent one of the ends of the split members, said endpiece member having an opening therein, a housing member adjacent the other end of the split members, said housing having a cut out portion adapted to receive the endpiece member and having a threaded opening aligned with the opening in said endpiece member and screw means extending through the opening in the endpiece member and into the threaded opening in the housing to secure the endpiece member in said housing, the axis of said openings being substantially parallel to the tangent of the rim at the split and lying at an acute angle with the horizontal plane connecting the mechanical centers of the lens holding members and converging with said plane on the temporal side of the lens holding member when the device is positioned as worn on the face of the wearer.

4. In an ophthalmic mounting, a pair of split lens holding members connected by a bridge member, said splits being located above a horizontal plane connecting the mechanical centers of the lens holding members and extending normal to the tangent of each lens holding member at said location, an endpiece member adjacent one of the ends of the split members, said endpiece member having a perforation therein, a housing member adjacent the other end of the split members, said housing having a tubular projection thereon and a cut out portion surrounding the tubular projection adapted to receive the perforated endpiece member, said tubular projection being adapted to be positioned within the perforated endpiece member when it is in position in the cut out portion and means for securing the perforated endpiece member in the housing, the axis of said perforation and the tubular member lying at an acute angle with the horizontal plane connecting the centers of the lens holding members and converging with the said plane on the temporal side of the lens holding member.

5. In an ophthalmic mounting, a pair of split lens holding members connected by a bridge member, said splits being located above a horizontal plane connecting the mechanical centers of the lens holding members and extending normal to the tangent of each lens holding member at said location, an endpiece member adjacent one of the ends of the split members having a tubular projection thereon, said endpiece member having a perforation therein aligned with the tubular projection, a housing member adjacent the other end of the split members having an opening adapted to receive the tubular projection and a cut out portion adapted to receive the perforated endpiece member, said tubular projection and perforation in the endpiece member having a threaded bore and means extending through the opening in the housing member and threaded within the threaded bore of the tubular projection and perforated endpiece member for securing said tubular projection and perforated endpiece member within the housing, the axis of said perforation and tubular projection lying at an acute angle with the horizontal plane connecting the centers of the lens holding members and converging with said plane on the temporal side of the lens holding member.

6. In a device of the character described, a split lens rim, the split lying above the center of the rim and the line of the split being substantially normal to the tangent to the rim at the split, interengaging lugs carried by each end of the rim, one of said lugs having spaced pivot ears for a temple connection, said ears extending rearwardly of the rim and inclined downwardly from the rim when the device is positioned as worn on the face of the wearer, a temple between the ears, a pivot pin extending through the ears and temple, the axis of the pivot pin being inclined rearwardly to the plane of the lens rim and lying substantially parallel with the vertical center line of said lens rim, means connecting the two lugs together, the axis of said connecting means being substantially parallel with the tangent to the rim at the split and being at a divergent angle with the axis of the pivot pin of the temple and converging with said axis of the pivot below the connection.

7. In a device of the character described, a split lens holding rim, the split lying above the center of the rim and the line of the split being substantially normal to the tangent to the rim at the split, interengaging lugs carried by the ends of the rim, one lug being entirely within the other and the top and bottom lines of the front of the visible lug lying substantially parallel with the horizontal center line of the rim when the device is positioned as worn on the face of the wearer, means to hold the lugs together, the axis of said means being substantially parallel with the tangent to the rim at the split, pivotal ears on the outer lug, a temple between the ears, a pivot pin through the temple and ears, the axis of said pin being divergent with the axis of the lug securing means and converging towards said axis of the securing means below the lugs.

NELSON M. BAKER.